(12) United States Patent
Meyer et al.

(10) Patent No.: US 7,215,726 B2
(45) Date of Patent: May 8, 2007

(54) METHOD FOR INTERFERENCE SUPPRESSION FOR TDMA -AND/OR FDMA TRANSMISSION

(75) Inventors: Raimund Meyer, Furth (DE); Robert Schober, Erlangen (DE); Wolfgang Gerstacker, Nuremberg (DE)

(73) Assignee: Com-Research GmbH, Furth (DE)

( * ) Notice: Subject to any disclaimer, the term of this patent is extended or adjusted under 35 U.S.C. 154(b) by 777 days.

(21) Appl. No.: 10/027,657

(22) Filed: Dec. 19, 2001

(65) Prior Publication Data

US 2002/0141437 A1  Oct. 3, 2002

(30) Foreign Application Priority Data

Dec. 28, 2000 (EP) ................. 00128664
Oct. 4, 2001 (EP) ................. 01123779

(51) Int. Cl.
*H04B 7/10* (2006.01)
*H04L 1/02* (2006.01)

(52) U.S. Cl. ............... 375/347; 375/346; 370/442; 370/480; 370/347; 370/344

(58) Field of Classification Search ............ 375/148, 375/347, 150, 346, 344; 370/342, 442, 480, 370/347

See application file for complete search history.

(56) References Cited

U.S. PATENT DOCUMENTS

| | | | |
|---|---|---|---|
| 5,414,728 A * | 5/1995 | Zehavi ................. | 375/142 |
| 5,548,613 A | 8/1996 | Kaku et al. | |
| 5,646,964 A | 7/1997 | Ushirokawa et al. | |
| 5,687,198 A * | 11/1997 | Sexton et al. ........... | 375/347 |
| 5,848,060 A * | 12/1998 | Dent ................... | 370/281 |
| 6,018,317 A * | 1/2000 | Dogan et al. ........... | 342/378 |
| 6,240,098 B1 * | 5/2001 | Thibault et al. ......... | 370/431 |
| 6,285,720 B1 * | 9/2001 | Martone ............... | 375/262 |
| 6,332,000 B1 * | 12/2001 | Lee .................... | 375/232 |
| 6,341,298 B1 * | 1/2002 | Ilani .................. | 708/520 |
| 6,430,216 B1 * | 8/2002 | Kober et al. ........... | 375/148 |
| 6,463,105 B1 * | 10/2002 | Ramesh ................ | 375/262 |
| 6,515,980 B1 * | 2/2003 | Bottomley ............. | 370/342 |
| 6,574,270 B1 * | 6/2003 | Madkour et al. ........ | 375/148 |

(Continued)

FOREIGN PATENT DOCUMENTS

JP  7-30519  1/1995

(Continued)

*Primary Examiner*—David C. Payne
*Assistant Examiner*—Jia Lu
(74) *Attorney, Agent, or Firm*—John A. Merecki; Hoffman, Warnick & D'Alessandro LLC

(57) ABSTRACT

A method for interference suppression for TDMA and/or FDMA transmission, which at least approximately can be described as pulse amplitude modulation, with an arbitrary number of receive antennas. The method comprises filtering of at least one complex-valued received signal $r_i[k]$ of one receive antenna with a filter with complex-valued coefficients $f_i[k]$ for generation of at least one output signal $y_i[k]$, forming at least one projection of at least one output signal $y_i[k]$ onto a vector $p_i$ which is assigned to this output signal $y_i[k]$, summing of a majority, especially all of the output signals $y_i[k]$ for forming a sum signal $s[k]$, and feeding the sum signal $s[k]$ into a device for detection, especially equalization. A system for interference suppression for TDMA and/or FDMA transmission is also disclosed.

6 Claims, 8 Drawing Sheets

U.S. PATENT DOCUMENTS

| | | | |
|---|---|---|---|
| 6,606,129 B1 * | 8/2003 | Limberg | 348/614 |
| 6,697,633 B1 * | 2/2004 | Dogan et al. | 455/509 |
| 6,745,050 B1 * | 6/2004 | Forsythe et al. | 455/561 |
| 6,829,312 B1 * | 12/2004 | Laurila et al. | 375/340 |
| 2002/0003843 A1 * | 1/2002 | Martone | 375/262 |
| 2002/0034191 A1 * | 3/2002 | Shattil | 370/464 |
| 2002/0048326 A1 * | 4/2002 | Sahlman | 375/297 |
| 2002/0085623 A1 * | 7/2002 | Madkour et al. | 375/148 |
| 2002/0090025 A1 * | 7/2002 | Kober et al. | 375/148 |
| 2002/0136277 A1 * | 9/2002 | Reed et al. | 375/148 |
| 2003/0072331 A1 * | 4/2003 | Jou | 370/503 |

FOREIGN PATENT DOCUMENTS

JP     7-202756     8/1995

* cited by examiner

METHOD FOR INTERFERENCE SUPPRESSION FOR TDMA -AND/OR FDMA TRANSMISSION

FIELD OF THE INVENTION

The invention concerns methods for digital data transmission as they are applied e.g. in digital mobile communication systems or for digital transmission over wire pairs. In particular, it concerns methods for interference suppression for TDMA- and/or FDMA transmission, which can be at least approximately described as pulse amplitude modulation, with an arbitrary number of receive antennas, in which the complex-valued received signal of at least one receive antenna is filtered with a filter with complex-valued coefficients to produce at least one output signal. Here, TDMA and FDMA refer to the access methods time-division multiple access and frequency-division multiple access, respectively. In addition, the invention concerns a system for interference suppression for TDMA- and/or FDMA transmission, which can be at least approximately described as pulse amplitude modulation, with an arbitrary number of receive antennas, in which the complex-valued received signal of at least one receive antenna is filtered with a filter device with complex-valued coefficients to produce at least one output signal.

BACKGROUND OF THE INVENTION

In digital transmission over dispersive channels, such as the mobile communication channel or wire pairs, the transmit signal is distorted and impaired by noise. Consequently, in the receiver special measures are necessary to recover the transmitted data from the received signal, i.e., an equalization method has to be applied. The optimum technique for equalization of dispersive channels is maximum-likelihood sequence estimation (MLSE) which is described in G. D. Forney, Jr. "Maximum-Likelihood Sequence Estimation of Digital Sequences in the Presence of Intersymbol Interference", IEEE Transactions on Information Theory, IT-18, 363–378, May 1972, and which can be implemented using the Viterbi algorithm. However, for long channel impulse responses and/or non-binary signal constellations the Viterbi algorithm is not applicable because here a large computational complexity results. Therefore, in these cases, suboptimum reduced-state sequence estimation (RSSE) methods, as described in M. V. Eyuboglu, S. U. Qureshi "Reduced-State Sequence Estimation with Set Partitioning and Decision Feedback", IEEE Trans. on Communication, COM-36, 13–20, January 1988, or Decision-Feedback Sequence Estimation (DFSE), as described in A. Duel-Hallen, C. Heegard "Delayed Decision-Feedback Sequence Estimation", IEEE Trans. on Communications, COM-37, 428–436, May 1989, have to be employed.

All methods cited above are optimized for the case where the received signal is impaired by additive white Gaussian noise (AWGN). In the presence of additional disturbances due to interference it has to be expected that these methods degrade severely because of metric mismatch and a too high disturbance variance. Disturbances due to interference become more and more important in mobile communication systems and in wire pair systems. A degradation of power efficiency results for both adjacent channel interference (ACI) and cochannel interference (CCI, i.e., signal and interference occupy the same frequency band) if no additional measures are taken. Prior to equalization the interference should be significantly reduced by an appropriate pre-processing technique to make the remaining impairment as small as possible and white. Since in a block transmission method the spectral characteristic of the interference varies from block to block, the pre-processing has to be adjusted in each block. An appropriate pre-processing strategy was proposed in S. Ariyavisitakul, J. H. Winters, N. R. Sollenberger "Joint Equalization and Interference Suppression for High Data Rate Wireless Systems", in Proceedings of Vehicular Technology Conference (VTC '99 Spring), 700–706, Houston, Tex., 1999. However, with this strategy a high performance can only be achieved for diversity reception, i.e., at least two receive antennas are necessary.

It is well known that transmission over a dispersive intersymbol interference (ISI) producing channel with pulse amplitude modulation (PAM) can be modeled as a discrete-time system as depicted in FIG. 1. The general case with N fold diversity (N≧1) at the receiver is considered, while mono reception (N=1) results as a special case. After sampling at symbol rate 1/T, the received signals are given by the convolution of the transmitted PAM sequence a[k] with the impulse response $h_i[k]$ of length $L_i$ of the channel pertaining to the ith antenna, impaired by discrete-time noise:

$$r_i[k] = \sum_{\kappa=0}^{L_i-1} h_i[\kappa]a[k-\kappa] + n_i[k], \; i \in \{1, 2, \ldots, N\} \tag{1}$$

Depending on the adopted modulation method the amplitude coefficients a[k] and the channel impulse responses $h_i[k]$ are either purely real, purely imaginary, or complex. With respect to the invention, in the following, we only consider modulation methods whose amplitude coefficients can be modeled at the receiver as purely real, purely imaginary, or as lying on an arbitrary straight line in the complex plane. E.g. binary continuous phase modulation (CPM) methods, which are often used in mobile communication systems due to their bandwidth efficiency and their low peak-to-average power ratio, can be approximately described by PAM signals as outlined in P. A. Laurent "Exact and approximate construction of digital phase modulations by superposition of amplitude modulated pulses (AMP)", IEEE Trans. on Commun., COM 34, 150–160, 1986. The discrete-time disturbance $n_i[k]$ consists of two components $$n_i[k] = n_i^{AWGN}[k] + n_i^{INT}[k], \tag{2}$$

where $n_i^{AWGN}[k]$ refers to the AWGN component, which has zero mean and is Gaussian distributed and white (the latter is true if a whitened matched filter, as described in G. D. Forney, Jr. "Maximum-Likelihood Sequence Estimation of Digital Sequences in the Presence of Intersymbol Interference", IEEE Transactions on Information Theory, IT-18, 363–378, May 1972, or a general square-root Nyquist filter is used as continuous-time receiver input filter prior to sampling). The disturbance by $n_i^{AWGN}[k]$ is mainly due to thermal noise in the receiver. $n_i^{INT}[k]$ is the disturbance due to interference, $$n_i^{INT}[k] = \sum_{\mu=1}^{L} \sum_{\kappa=0}^{L_{i,\mu}^{INT}-1} h_{i,\mu}^{INT}[\kappa]a_\mu^{INT}[k-\kappa], \; i \in \{1, 2, \ldots, N\}. \tag{3}$$

Here, $$h_{i,\mu}^{INT}[\kappa]$$

refers to the channel impulse response from the μth interferer to receive antenna i and $$L_{i,\mu}^{INT}$$

is the corresponding impulse response length. The general case with I interferers, whose data symbols are denoted by $$a_\mu^{INT}[\kappa],$$

is considered. With respect to the invention, again modulation methods with purely real or purely imaginary amplitude coefficients, or amplitude coefficients which lie on a straight line in the complex plane, are exclusively presumed. Since purely imaginary amplitude coefficients and amplitude coefficients which lie on an arbitrary straight line can be transformed into purely real amplitude coefficients by a simple phase rotation, in the following, only the latter case will be considered.

If the continuous-time received signals of the different antennas are fractionally-spaced sampled with sample frequency K/T (K: oversampling factor, e.g. K=2), in principle, the same model results. In this case, the discrete-time received signals of the different antennas can be represented by K symbol-rate (1/T) polyphase components. Consequently, the number of discrete-time symbol-rate received signals is increased to N·K. Therefore, in principle, the following considerations are also applicable for fractionally-spaced sampling. In principle, there are two different approaches for reconstruction of the transmitted symbols, cf. e.g. C. Tidestav, M. Sternad, A. Ahlen "Reuse Within a Cell—Interference Rejection or Multiuser Detection", IEEE Trans. on Commun., COM-47, 1511–1522, October 1999. For the first approach the principles of multiuser detection are employed, i.e., the symbol sequences a[•] and $$a_\mu^{INT}[\cdot], \mu \in \{1, 2, \ldots, I\}$$

are jointly estimated (joint maximum-likelihood sequence estimation). In the expressions for the symbol sequences the dot [•] indicates the entire symbol sequence a[k], with −∞<k<+∞.

With this approach the optimum estimation quality can be achieved. Unfortunately, the required computational complexity for the joint (or iterative) estimation is very high. In addition, for this approach the channel impulse responses $$h_{i,\mu}^{INT}[\kappa]$$

are required, whose estimation is very difficult, since, in general, the receiver does not have knowledge about the training sequences of the interfering signals and also the temporal position of the training sequences is unknown, cf. e.g. B. C. Wah Lo, K. Ben Letaief "Adaptive Equalization and Interference Cancellation for Wireless Communication Systems", IEEE Trans. on Commun. COM-47, 538–545, April 1999. For these reasons the second approach, where interference suppression with subsequent equalization is performed, is more promising. A method based on this approach was proposed in S. Ariyavisitakul, J. H. Winters, N. R. Sollenberger "Joint Equalization and Interference Suppression for High Data Rate Wireless Systems", in Proceedings of Vehicular Technology Conference (VTC '99 Spring), 700–706, Houston, Tex., 1999. Thereby the N different discrete-time received signals $r_i[k]$ are filtered separately and the filter output signals are combined, cf. FIG. 1. Subsequently, equalization is performed, e.g. MLSE, RSSE, DFSE or DFE (decision-feedback equalization). The resulting block diagram of the receiver is depicted in FIG. 1. The signal after feedforward filtering and combining is given by $$s[k] = \sum_{i=1}^{N} \sum_{\kappa=0}^{L_i^f - 1} f_i[\kappa] r_i[k - \kappa] \qquad (4)$$

The ith filter for filtering of the received sequence $r_i[k]$ is shown in detail in FIG. 2. The optimization of the filter impulse responses $f_i[k]$ of lengths $L_i^f$ can be e.g. accomplished using a multiple-input single-output minimum mean-squared error decision-feedback equalizer (MISO MMSE-DFE), whose structure is depicted in FIG. 3. Thereby, thick lines and thin lines refer to complex-valued and real-valued signals and systems, respectively. For the special case of a single receive antenna (N=1) the resulting structure is depicted in FIG. 4. In the DFE the complex-valued impulse responses $f_i[k]$ are the feedforward filters and have to be adaptively jointly optimized with the complex-valued feedback filter b[k]. When the adaptation process is completed, the feedforward filter coefficients are carried over to the structure according to FIG. 1. If the filter lengths are chosen sufficiently large, after the combination the interference is significantly reduced and, in addition, the total disturbance at this point is approximately white and Gaussian distributed and, therefore, the subsequent application of trellis-based equalization techniques is justified.

A closed-form solution for calculation of the prefilters, as e.g. proposed in EP 99 301 299.6 for calculation of the prefilter for DFSE/RSSE and disturbance by white noise, cannot be applied. For this, not only the impulse responses $h_i[k]$ but also the impulse responses of the interfering signals $h_{i,\mu}^{INT}[\kappa]$ would have to be known. However, the latter cannot be easily estimated since, in general, the training sequences of the interfering signals are not known at the receiver. Therefore, filter calculation has to be performed using a recursive adaptive algorithm. In S. Ariyavisitakul, J. H. Winters, N. R. Sollenberger "Joint Equalization and Interference Suppression for High Data Rate Wireless Systems", Proceedings of Vehicular Technology Conference (VTC'99 Spring), 700–706, Houston, Tex., 1999, the application of the recursive-least squares (RLS) algorithm was proposed for filter optimization, cf. also S. Haykin "Adaptive Filter Theory", Prentice Hall, Upper Saddle River, N.J., third edition, 1996. A significant disadvantage of this approach is that high performance cannot be achieved in case of mono reception (N=1). The main reason for this is that in this case an interfering signal cannot be sufficiently suppressed. With reference to FIG. 3, for N=2 the signals $r_1[k]$ and $r_2[k]$ comprise the respective received signal and noise, where the interfering signals are contained in the noise. Adjusting the filter coefficients suitably, the interfering signals may cancel each other. For N=1 there is only one received signal and, therefore, cancellation is not possible, of course.

SUMMARY OF THE INVENTION

The task of the present invention is to improve this type of methods and this type of systems in such a way that improved interference suppression is possible. According to an additional aspect of the invention good interference suppression shall also be possible for mono reception. Furthermore, it is desirable to achieve a higher performance for diversity reception than previously proposed methods for interference suppression.

The invention is based on the observation that as a consequence of projections interference and signal can be separated. Since only the projections of the received signals are processed, filter coefficients for minimization of the error in the sum of the projected signals, which exclusively is of interest, can be found and utilized.

The method and the system according to the invention enable the (adaptive) interference suppression for equalization with or without antenna diversity for transmission with pulse amplitude modulation with purely real or purely imaginary data sequences, or data sequences which lie on an arbitrary straight line in the complex plane, and sufficiently distinct impulse responses. In particular, for mono reception a significantly better interference suppression than with prior art techniques can be achieved. With the invented method 2N−1 interfering signals can be suppressed in general, whereas only N−1 interfering signals can be suppressed with conventional methods. The error rate of the subsequent equalization can be reduced significantly by the invented method.

Usually in a practical implementation the method does not cause additional complexity or even allows to reduce complexity compared to prior art methods. A comparison of the prior art methods according to FIGS. 3 and 4 with the new structure according to FIGS. 6 and 7 shows that only the projections $P_1\{\cdot\}$ to $P_n\{\cdot\}$ have to be additionally performed, whereas the feedback filter is simpler and has only real-valued coefficients.

In an especially preferred version of the invention, at least two received signals $r_i[k]$ are available and the respective at least two output signals $y_i[k]$ are projected in step b) on identical vectors. This measure has the advantageous effect that the projection step and the summation step can be interchanged and the projections after the summation can be realized by a single projection.

In a further preferred version, for filtering of the received signals in step a) the feedforward filters of a DFE with real-valued feedback filter are used, which are systematically optimized, where in particular ZF, MMSE, or impulse truncation criteria may be adopted. Therefore, it is possible to optimize the filter coefficients in a simple manner.

For optimization of the filter coefficients preferably the signals after the projections are utilized. This enables an improved interference suppression since the interference is shifted into the sum of the orthogonal complements of the projections.

For adjustment of the coefficients of the at least one complex-valued filter an arbitrary adaptive algorithm can be employed. This ensures that an adjustment to the respective interference situation is automatically achieved.

The adaptive algorithm for adjustment of the filter coefficients can utilize a training sequence which is known at the receiver. If no known training sequence is transmitted or if the known training sequence is too short, a blind adaptive algorithm can be employed for adjustment of the filter coefficients.

From the calculation of the orthogonal complement of the projection of at least one filtered output signal $y_i[k]$ a criterion for the transmission quality can be easily obtained.

If transmit antenna diversity is employed, in a first step at least a part of the transmit signals can be interpreted as interference and suppressed using the invented method. Subsequently, in a second step the data symbols, which have been detected in the first step, can be utilized to model the corresponding parts of the received signal; forming a difference signal the corresponding signal parts can be removed from the received signal and the detection of the remaining data symbols, which in the first step have been interpreted as interference, becomes possible. Alternatively, in the second step the first step can be repeated, however, thereby the data symbols, which have been detected in the first step, are interpreted as interference, and the data symbols, which have been interpreted as interference in the first step, are now interpreted as useful data. Therefore, the method is also well suited to achieve high performance for transmit antenna diversity.

BRIEF DESCRIPTION OF THE DRAWINGS

In the following, example versions of the invention are described in more detail with reference to the attached figures. It can be seen in.

DETAILED DESCRIPTION OF THE INVENTION

Figure 1:
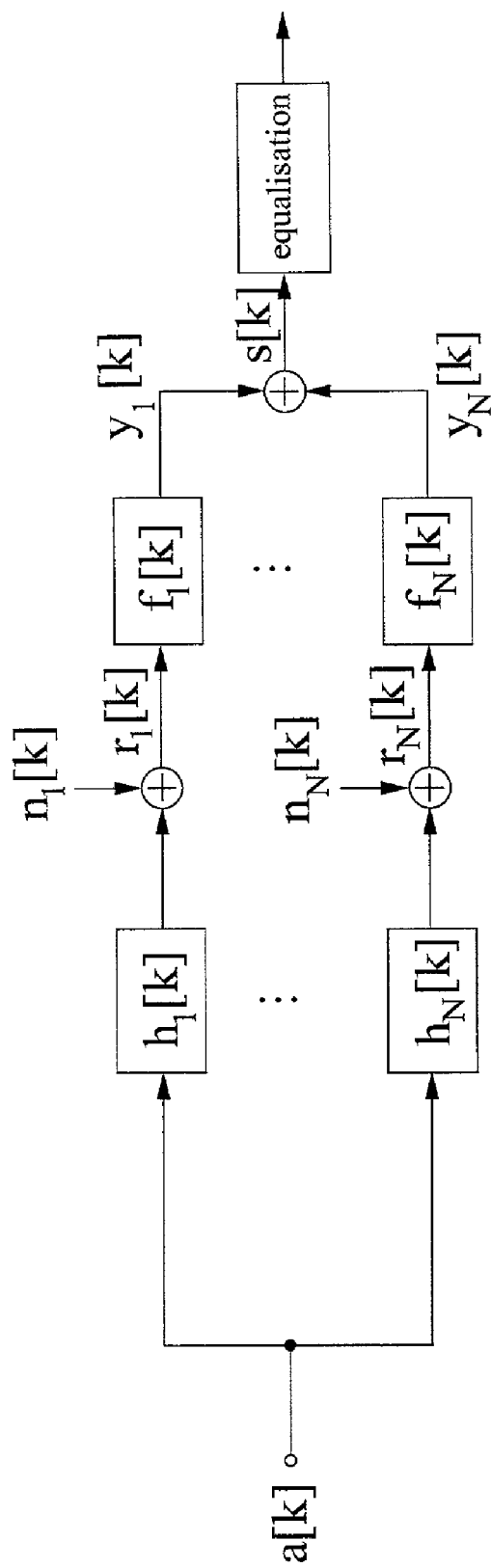
FIG. 1: discrete-time version of the block diagram for a digital transmission system with N fold antenna diversity at the receiver (prior art)
Figure 2:
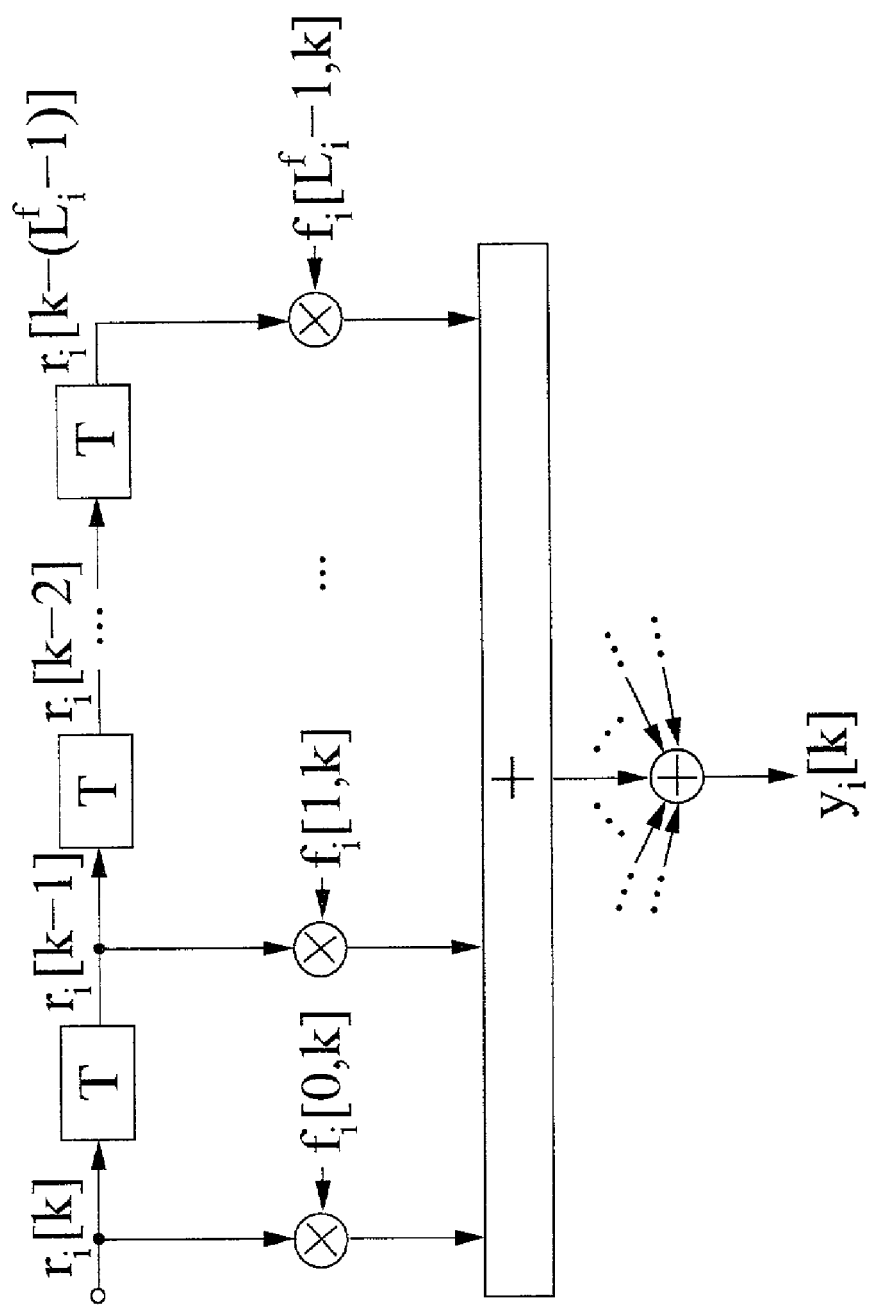
FIG. 2: detailed figure of the ith feedforward filter for filtering of the ith received signal (prior art)
Figure 3:
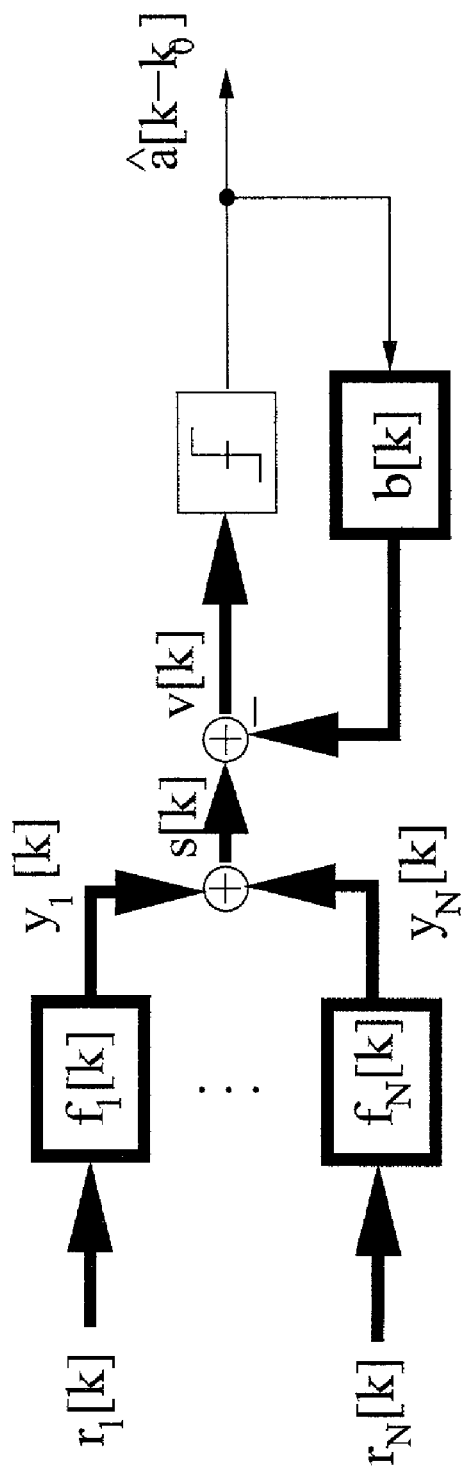
FIG. 3: block diagram representation of a conventional DFE receiver for the case of N receive antennas (prior art)
Figure 4:
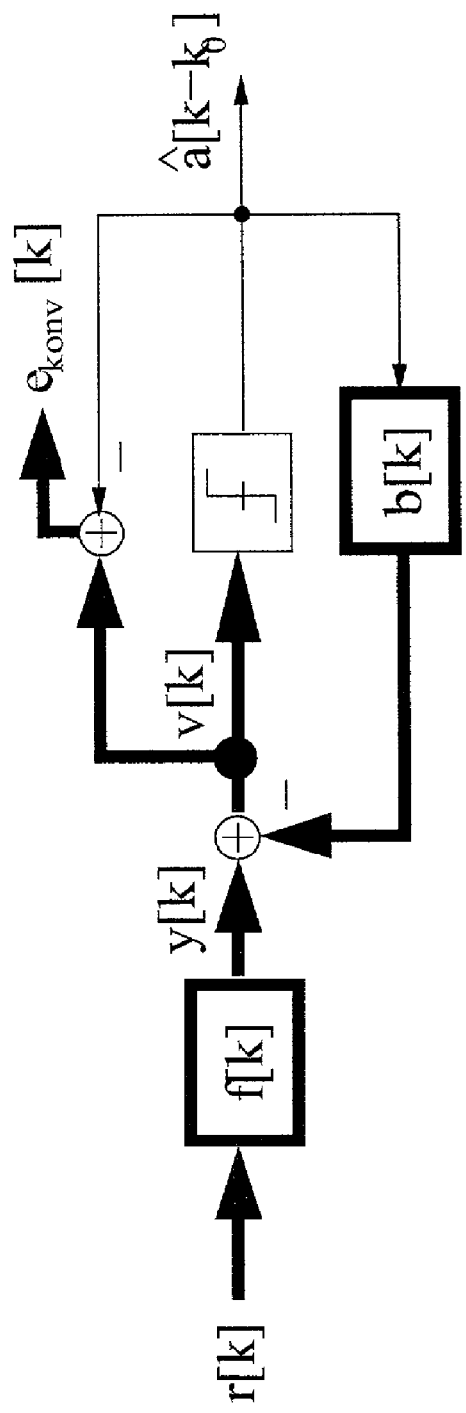
FIG. 4: block diagram representation of a conventional DFE receiver for the case of one receive antenna (prior art)
Figure 5:
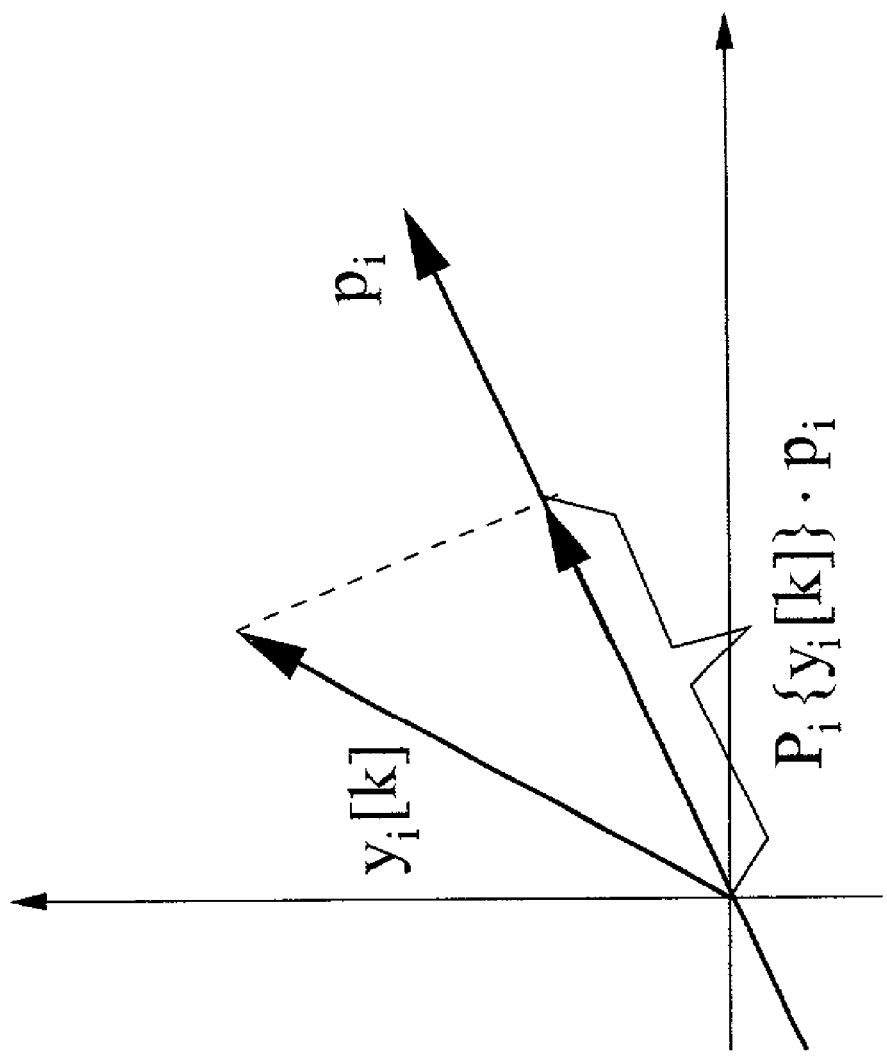
FIG. 5: schematic representation of the projection $P_i\{y_i[k]\}$ of signal $y_i[k]$ onto the complex vector $p_i$ of unit length.
Figure 6:
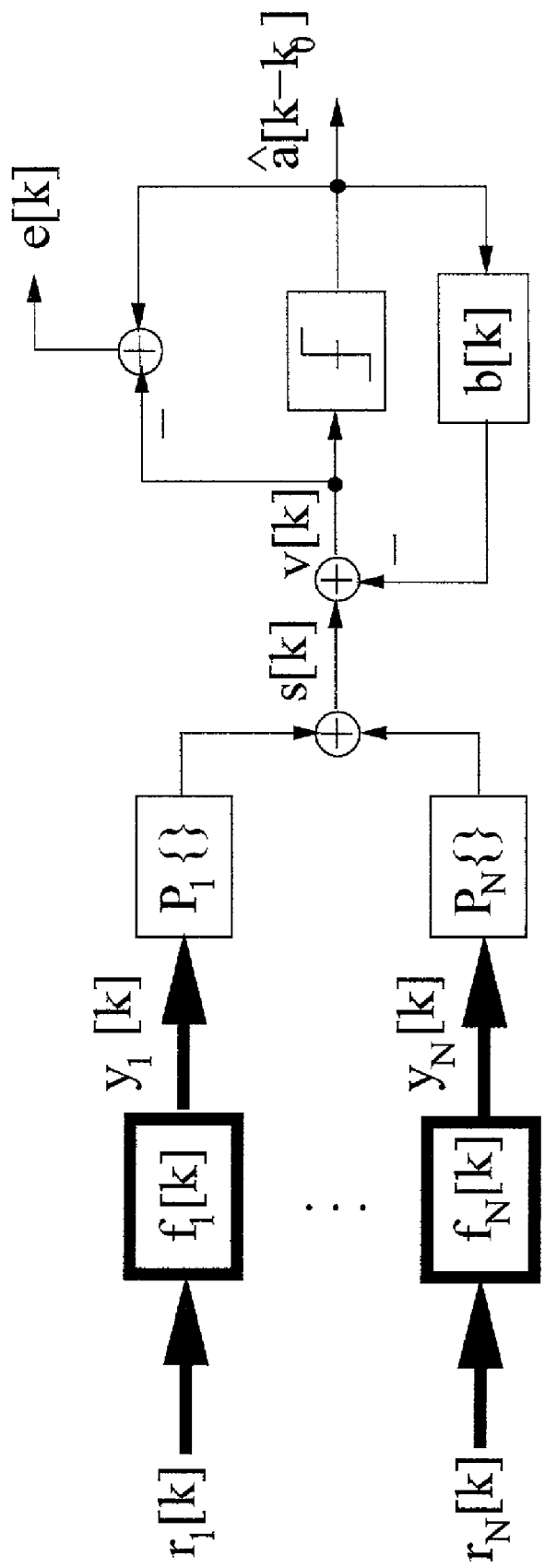
FIG. 6: a DFE receiver for the case of N receive antennas with realization of projections after feedforward filtering according to the invention.

In the invention an improved interference suppression is accomplished by modifying the DFE structure according to FIG. 3 and FIG. 4, respectively. After the complex-valued feedforward filtering, projections $P_i\{\cdot\}$ onto vectors $p_i$ of unit length are performed, which yield purely real-valued results $P_i\{y_i[\cdot]\}$, cf. FIG. 5. This leads to a structure according to FIG. 6. Since the signal y[k] is real-valued, now a purely real-valued filter b[k] suffices for feedback filtering; the error signal $e[k]=v[k]-a[k-k_0]$ is also purely real-valued.

For minimization of the power of e[k] the orthogonal complements of the feedforward filter output signals with respect to the projection operators $P_i\{\bullet\}$ are not considered, which is possible since for the decision process for real-valued amplitude coefficients only one dimension is of interest. Now, the filter coefficients can be adjusted for minimization of the error in the sum of the projected signals, which is exclusively of interest, whereas the orthogonal complements are neglected. As a consequence by a suitable choice of the filter coefficients the disturbance by interference can be shifted into the sum of the orthogonal complements of the feedforward filter output signals, which is irrelevant for the decision. Therefore, the sum of orthogonal complements can be optionally utilized for estimation of the interference power. A special case, which is of interest for implementation, results if all N projection vectors of the output signals $y_i[k]$ are identical and therefore, the projections can be realized as a single projection after the summation.

It turns out that a very good interference suppression can be achieved if the prefilter coefficients $f_i[k]$, $1 \leq i \leq N$, are adjusted favourably, provided that the channel impulse responses $h_i[\kappa]$ and $$h_{i,\mu}^{INT}[\kappa]$$

are sufficiently different and the data symbol sequences a[k] and $$a_\mu^{INT}[k]$$

are real-valued. After prefiltering with the feedforward filters of the modified DFE for interference suppression according to FIG. 6 and subsequent projection of the filter output signals, equalization can be performed adopting e.g. a sequence estimation method such as MLSE, DFSE, or RSSE. The signal component $\tilde{y}[k]$ of the equalization method is given by $$\tilde{y}[k] = a[k - k_0] + \sum_{\kappa=1}^{L^b} b[\kappa]a[k - k_0 - \kappa]. \tag{5}$$

The required complexity can be optionally controlled by the choice of the feedback filter length $L^b$, i.e., the number of coefficients b[k] (impulse truncation with DFE). For optimization of the DFE filters various criteria can be adopted, e.g. zero forcing (ZF) criterion, maximum SNR or minimum mean-squared error (MMSE). As a special case the adaptive adjustment of the DFE according to the MMSE criterion with the least-mean-square (LMS) algorithm is considered. For the adaptation it has to be taken into account that in the algorithm knowledge of the data symbols is required for error calculation and feedback filtering. Therefore, the training sequence, which is transmitted in many transmission systems to facilitate channel estimation, is also used for DFE adaptation, i.e., for error calculation and feedback filtering training symbols are utilized. During data transmission the adaptation can proceed in the decision directed mode, i.e., instead of training symbols previously decided data symbols delivered by the equalizer are employed, which coincide with the actual data symbols with sufficiently high probability after the training period. Alternatively, the recursive least-squares (RLS) algorithm or a blind adaptive algorithm, which only requires knowledge about the statistics of the transmitted data sequence, but not the data symbols themselves, can be employed instead of the LMS algorithm. However, for blind adaptive algorithms a slower convergence than for trained adaptive algorithms is inevitable.

For simplicity, for description of the LMS algorithm for adaptation of the proposed novel DFE structure the (complex conjugated) filter coefficients are collected in vectors $$f_i[k] = [f_i[0,k]\ f_i[1,k]\ldots f_i[L_i^f - 1,k]]^H, i \in \{1, 2, \ldots, N\}, \tag{6}$$

$$b[k] = [b[1,k]\ b[2,k]\ldots b[L^b,k]]^T, \tag{7}$$

$((\bullet)^H$ and $(\bullet)^T$ refer to Hermitian transposition and transposition, respectively). Now, the filter coefficients are time-varying because of adaptation. This can be seen from the fact that now the filter coefficients also depend on the real time k. The signal s[k] after the projections and the combination is given by $$s[k] = \sum_{i=1}^{N} P_i\{f_i^H[k]r_i[k]\} \tag{8}$$

with $$r_i[k] = [r_i[k]\ r_i[k-1]\ldots r_i[k-(L_i^f-1)]]^T, i \in \{1, 2, \ldots, N\}. \tag{9}$$

The DFE slicer input signal is given by $$v[k] = s[k] - b^T[k]\hat{a}[k] = \sum_{i=1}^{N} P_i\{f_i^H[k]r_i[k]\} - b^T[k]\hat{a}[k], \tag{10}$$

with $$\hat{a}[k] = [\hat{a}[k-k_0-1]\ \hat{a}[k-k_0-2]\ldots \hat{a}[k-k_0-L^b]]^T. \tag{11}$$

The decision delay $k_0$ is a degree of freedom which can be utilized for optimization of power efficiency. Thereby, $\hat{a}[\bullet]$ denotes the data sequence estimated by the DFE. If there is a known data sequence as training sequence (training mode), the $\hat{a}[\bullet]$ can be replaced by known data symbols $a[\bullet]$. Correspondingly, in FIG. 6 $\hat{a}[\bullet]$ has to be replaced by $a[\bullet]$ for error calculation and feedback. The error signal for DFE is defined by $$e[k] = v[k] - \hat{a}[k - k_0], \tag{12}$$

and $$e[k] = \sum_{i=1}^{N} P_i\{f_i^H[k]r_i[k]\} - b^T[k]\hat{a}[k] - \hat{a}[k-k_0] \tag{13}$$

holds. For the following, the filter coefficient vectors and the filter input vectors are collected in a single vector, respectively, $$w[k] = [f_1^T[k]\ f_2^T[k]\ldots f_N^T[k]b^T[k]]^T, \tag{14}$$

$$u[k]=[r_1^T[k]\ r_2^T[k]\ldots r_N^T[k]-\hat{a}^T[k]]^T. \quad (15)$$

The LMS algorithm for adaptive adjustment of the filter coefficient vectors is given by the following equation, as described in S. Haykin "Adaptive Filter Theory", Prentice-Hall, Upper Saddle River, N.J., third Edition, 1996:

$$w[k+1]=w[k]-\mu e[k]u[k], \quad (16)$$

where μ refers to a step size parameter, which has to be chosen suitably to enable both fast convergence and stable operation. The recursion is initialized e.g. by $$w[0]=0. \quad (17)$$

The described DFE structure can also be used for interference suppression if additionally M fold ($M \geq 1$) transmit antenna diversity is employed, which is e.g. the case for space-time coded transmission to increase capacity, as described in A. F. Naguib, N. Seshadri, and A. R. Calderbank "Increasing Data Rate over Wireless Channels", IEEE Signal Processing Magazine, 76–92, May 2000. The proposed method can be e.g. directly applied in combination with the space-time coding method proposed in J. H. Winters "The Diversity Gain of Transmit Diversity in Wireless Systems with Rayleigh Fading", IEEE Transactions on Vehicular Technology, 119–123, February 1998. With respect to the invention, approximate PAM transmission methods are methods, whose transmit signal can be sufficiently accurate approximated as a PAM signal, which is e.g. the case for binary continuous phase modulation (CPM).

Figure 7:
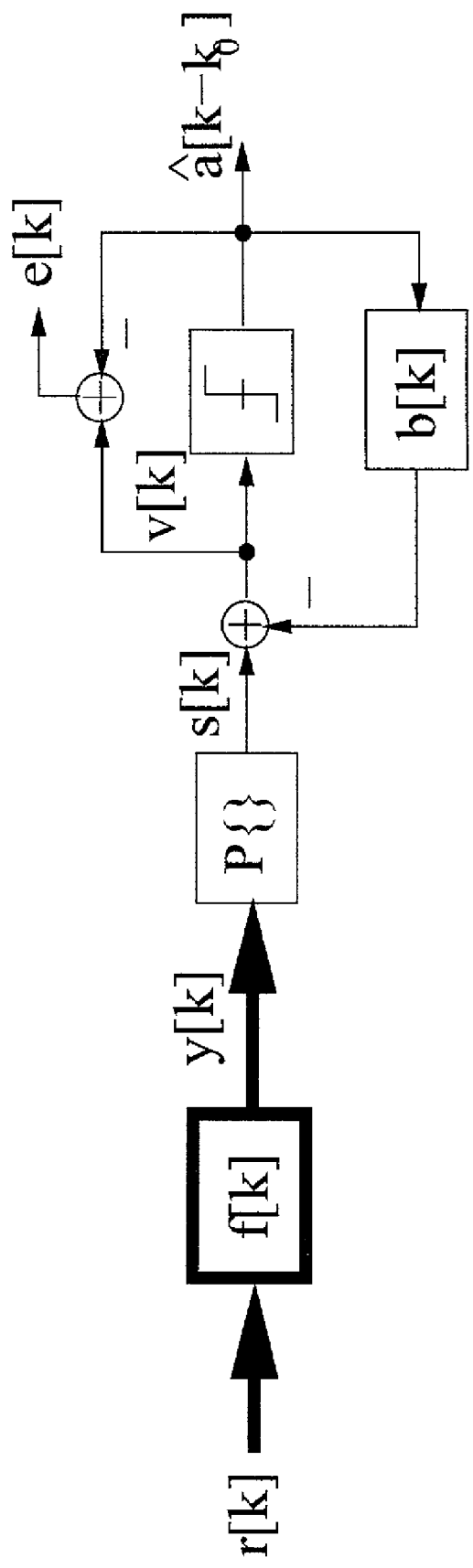
FIG. 7: a DFE receiver for the case of one receive antenna (mono reception) with realization of one projection after feedforward filtering according to the invention.
Figure 8:
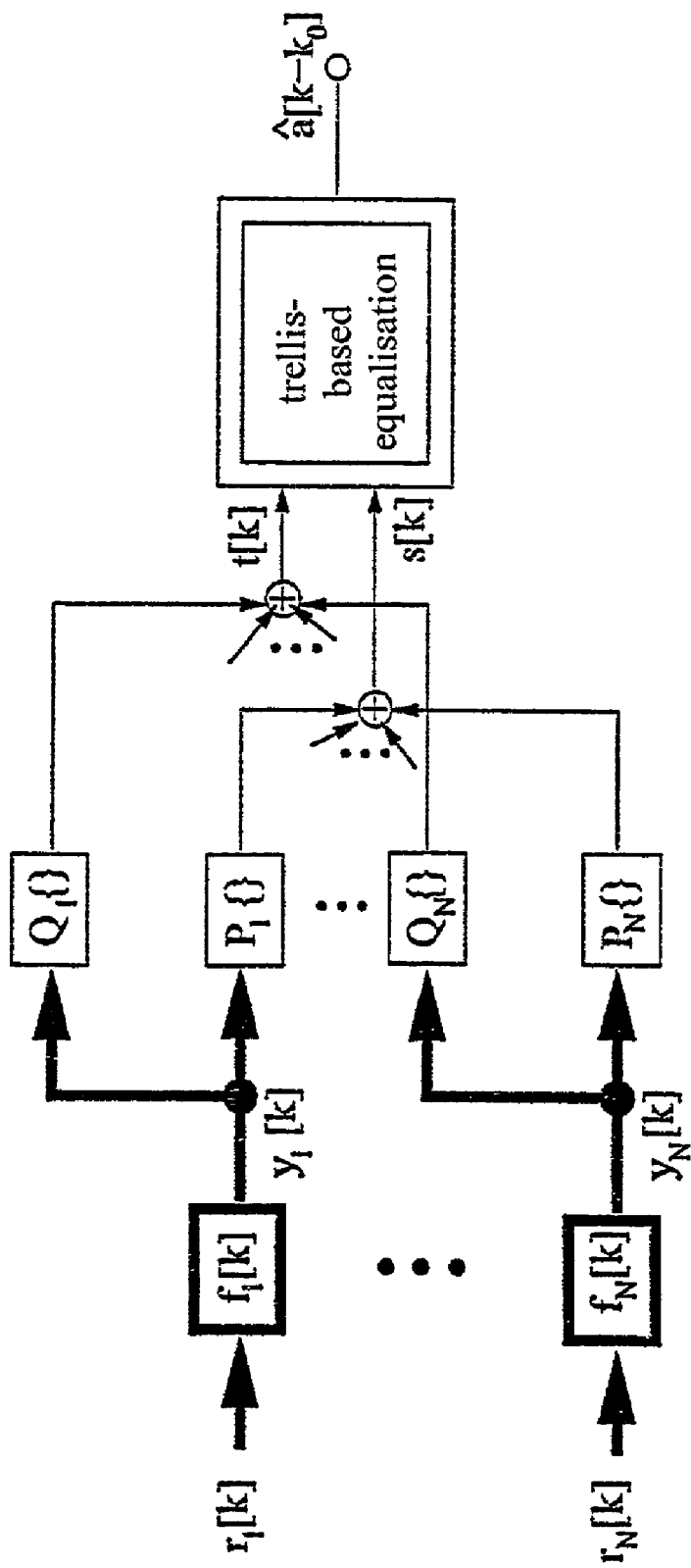
FIG. 8: a DFE receiver in which additionally the sum of the orthogonal complements of the projections of the output signals of the feedforward filters are processed.

As a special example version, in the following, the case of mono reception (N=1) is considered. This case is mainly of interest for mobile stations. Here, in contrast to base stations, antenna diversity usually cannot be employed, because this is not conform with a compact, energy saving, and low-cost mobile phone. Again, it is presumed that both the data sequence of the useful signal and the data sequences of the interferers are purely real and that the corresponding impulse responses are sufficiently different. The corresponding DFE structure with projection $P\{\bullet\}$ is depicted in FIG. 7.

While the described structures guarantee very good interference suppression if the filter lengths $L_i^f$ and $L^b$ are sufficiently large, for complexity reasons and because of the short training sequence, in practice, usually relatively short feedforward and feedback filters are used. In this case, the signal according to Eq. (8) contains in general a noise component due to interference which cannot be neglected, and without additional measures a significant performance degradation results.

Therefore, if short DFE filters are utilized, the method should be refined. For this purpose, also the sum of the orthogonal complements of the projections of the feedforward filter output signals can be considered, $$t[k] = \sum_{i=1}^{N} Q_i\{f_i^H[k]r_i[k]\}, \quad (18)$$

where $Q_i\{\bullet\}$ refers to projections onto complex vectors $q_i$ of unit length. Thereby, vector $q_i$ is orthogonal to vector $p_i$ which belongs to projection $P_i\{\bullet\}$. The signal $t[k]$ contains in general a larger noise component than the signal $s[k]$, however, it also contains a signal component, i.e, $$t[k] = \sum_{\kappa=\kappa_1}^{\kappa_2} c[\kappa]a[k-k_0-\kappa]+n_t[k], \quad (19)$$

where both the impulse response $c[\bullet]$, whose coefficients are non-zero in the interval $\kappa_1 \leq \kappa \leq \kappa_2$, and the disturbance $n_t[k]$, which consists of noise and interference, are purely real-valued. After the DFE adaptation is completed the coefficients $c[\kappa]$ can be easily determined using a channel estimation method. After channel estimation the variance $\sigma_{n_t}^2$ of the disturbance $n_t[k]$ can be estimated.

Now, it is advantageous to employ the signal $t[k]$ also in the trellis-based equalization method. For this purpose the signal $s[k]$ is written in the form $$s[k] = a[k-k_0] + \sum_{\kappa=1}^{L^b} b[\kappa]a[k-k_0-\kappa]+n_s[k] \quad (20)$$

where the disturbance $n_s[k]$ has variance $\sigma_{n_s}^2$ and again contains both noise and interference. In order to take advantage of both signals $s[k]$ and $t[k]$ in a trellis-based equalization method, e.g. the branch metric $$\lambda[k] = \frac{1}{\sigma_{n_s}^2}\left|s[k]-\tilde{a}[k-k_0]-\sum_{\kappa=1}^{L^b}b[\kappa]\tilde{a}[k-k_0-\kappa]\right|^2 + \quad (21)$$

$$\frac{1}{\sigma_{n_t}^2}\left|t[k]-\tilde{a}[k-k_0]-\sum_{\kappa=\kappa_1}^{\kappa_2}c[\kappa]\tilde{a}[k-k_0-\kappa]\right|^2$$

can be used in the trellis diagram (maximum ratio combining), where for MLSE equalization $\tilde{a}[\bullet]$ refers to trial symbols which depend on the state transitions; for reduced-state equalization methods $\tilde{a}[k-k_0-\kappa]$ refers to trial symbols and state dependent register contents for $\kappa \leq \kappa_{red}$ and $\kappa > \kappa_{red}$, respectively, where $\kappa_{red}$ depends on the chosen state reduction method. Note that for Eq. (21) statistical independent white Gaussian distributed disturbances $n_s[\bullet]$ and $n_t[\bullet]$ are assumed. In practice, this is only approximately true and in particular $n_t[\bullet]$ in general is not white. Therefore, it is advantageous to filter the signal $t[k]$ before trellis-based equalization with a noise whitening filter, which transforms $n_t[\bullet]$ into a white disturbance and which can be calculated from the autocorrelation sequence of $n_t[\bullet]$, which has to be estimated using an appropriate technique. In Eq. (21)

$$\sigma_{n_t}^2,$$

$t[k]$, and $c[\bullet]$ have to be substituted by the noise variance at the output of the noise whitening filter, the signal at the output of the noise whitening filter, and the convolution of the original impulse response with the impulse response of the noise whitening filter, respectively.

With the introduced two channel structure a diversity effect can be achieved and therefore a high performance results even if short DFE filters are employed.

The invention claimed is:

1. Method for interference suppression for time-division multiple access (TDMA) and/or frequency division multiple access (FDMA) transmission, which at least approximately can be described as pulse amplitude modulation, with an arbitrary number of receive antennas, which comprises the following steps:
   a) filtering of at least one complex-valued received signal $r_i(k)$ of one receive antenna with a filter with complex-valued coefficients $f_i(k)$ for generation of at least one output signal $y_i(k)$;
   b) forming at least one orthogonal projection of at least one output signal $y_i(k)$ onto a vector $p_i$ which is assigned to this output signal $y_i(k)$; and if the number of output signals $y_i(k)$ is one:
   c1) feeding the output signal $y_i(k)$ into a device for detection, especially equalization; or if the number or output signals $y_i(k)$ is two or more:
   d1) summing of a majority, especially all of the output signals $y_i(k)$ for forming a sum signal $s(k)$; and
   d2) feeding the sum signal $s(k)$ into a device for detection, especially equalization,
       wherein at least two received signals $r_i(k)$ are available and the corresponding at least two outputs $y_i(k)$ are projected onto identical vectors in step b).

2. Method for interference suppression for time-division multiple access (TDMA) and/or frequency division multiple access (FDMA) transmission, which at least approximately can be described as pulse amplitude modulation, with an arbitrary number of receive antennas, which comprises the following steps:
   a) filtering of at least one complex-valued received signal $r_i(k)$ of one receive antenna with a filter with complex-valued coefficients $f_i(k)$ for generation of at least one output signal $y_i(k)$;
   b) forming at least one orthogonal projection of at least one output signal $y_i(k)$ onto a vector $p_i$ which is assigned to this output signal $y_i(k)$; and if the number of output signals $y_i(k)$ is one:
   c1) feeding the output signal $y_i(k)$ into a device for detection, especially equalization; or if the number or output signals $y_i(k)$ is two or more:
   d1) summing of a majority, especially all of the output signals $y_i(k)$ for forming a sum signal $s(k)$; and
   d2) feeding the sum signal $s(k)$ into a device for detection, especially equalization,
       wherein feedforward filters of a decision-feedback-equalization (DFE) with real-valued feedback filter are used for filtering of the received signals in step a), which are optimized systematically,
       in particular according to the criteria zero-forcing (ZF), minimum mean-squared (MMSE), or impulse truncation.

3. System for interference suppression for time-division multiple access (TDMA) and/or frequency division multiple access (FDMA) transmission, which at least approximately can be described as pulse amplitude modulation, comprising
   an arbitrary number of receive antennas;
   at least one filter device with complex-valued coefficients $f_i(k)$ for filtering of at least one complex-valued received signal $r_i(k)$ of one receive antenna for forming at least one output signal $y_i(k)$;
   at least one projection device for forming an orthogonal projection of the at least one output signal $y_i(k)$ onto a vector $p_i$ which is assigned to this output signal; and
   if the number of output signals $y_i(k)$ is one:
       a detection device which processes the output signal $s(k)$; or
   if the number or output signals $y_i(k)$ is two or more:
       a summation device for summing a majority, in particular all output signals $y_i(k)$ for forming a sum signal $s(k)$; and
       a detection device which processes the sum signal $s(k)$,
           wherein at least two received signals $r_i(k)$ are available and the corresponding at least two outputs $y_i(k)$ are projected onto identical vectors by the at least one projection device.

4. Receiver designed for acting in concert with one or several receiving antennae for interference suppression for time-division multiple access (TDMA) and/or frequency division multiple access (FDMA) transmission comprising at least pulse amplitude modulation or binary continuous phase modulation (CPM), comprising:
   at least a filtering device including complex-valued coefficients $f_i(k)$, with the at least one filtering device being designed for filtering at least one complex-valued received signal $r_i(k)$ of a receiving antennae for generating at least one output signal $y_i(k)$;
   wherein
   the receiver further comprises
   at least one projection device to which the at least one output signal $y_i(k)$ is coupled for forming an orthogonal projection $P_i$ of the at least one output signal $y_i(k)$ onto a direction vector $p_i$ assigned to this output signal $y_i(k)$, with the dimension of the direction vector $p_i$ irrespective of the number of receiving antennae being two; and
   in case the number of the projections $P_i$ is one:
       a device for detection to which the output signal of the projection $P_i$ is coupled; or
   in case the number of the projections is two or more:
       a device for summing a majority of the projections $P_i$ for forming a sum signal $s(k)$; and
       a device for detection to which the sum signal $s[k]$ is coupled, wherein at least two received signals $r_i(k)$ are available
   and the corresponding at least two outputs $y_i(k)$ are projected onto identical vectors by the at least one projection device.

5. System for interference suppression for time-division multiple access (TDMA) and/or frequency division multiple access (FDMA) transmission, which at least approximately can be described as pulse amplitude modulation, comprising
   an arbitrary number of receive antennas;
   at least one filter device with complex-valued coefficients $f_i(k)$ for filtering of at least one complex-valued received signal $r_i(k)$ of one receive antenna for forming at least one output signal $y_i(k)$;
   at least one projection device for forming an orthogonal projection of the at least one output signal $y_i(k)$ onto a vector $p_i$ which is assigned to this output signal; and
   if the number of output signals $y_i(k)$ is one:
       a detection device which processes the output signal $s(k)$; or
   if the number or output signals $y_i(k)$ is two or more:
       a summation device for summing a majority, in particular all output signals $y_i(k)$ for forming a sum signal $s(k)$; and
       a detection device which processes the sum signal $s(k)$,
           wherein feedforward filters of a decision-feedback-equalization (DFE) with real-valued feedback filter are used for filtering of the received signals, which are optimized systematically, in particular according to the criteria zero-forcing (ZF), minimum mean-squared (MMSE), or impulse truncation.

6. Receiver designed for acting in concert with one or several receiving antennae for interference suppression for time-division multiple access (TDMA) and/or frequency division multiple access (FDMA) transmission comprising at least pulse amplitude modulation or binary continuous phase modulation (CPM), comprising:

at least a filtering device including complex-valued coefficients $f_i(k)$, with the at least one filtering device being designed for filtering at least one complex-valued received signal $r_i(k)$ of a receiving antennae for generating at least one output signal $y_i(k)$;

wherein the receiver further comprises at least one projection device to which the at least one output signal $y_i(k)$ is coupled for forming an orthogonal projection $P_i$ of the at least one output signal $y_i(k)$ onto a direction vector $p_i$ assigned to this output signal $y_i(k)$, with the dimension of the direction vector $p_i$ irrespective of the number of receiving antennae being two; and in case the number of the projections $P_i$ is one:

a device for detection to which the output signal of the projection $P_i$ is coupled; or in case the number of the projections is two or more:

a device for summing a majority of the projections $P_i$ for forming a sum signal $s(k)$; and a device for detection to which the sum signal $s[k]$ is coupled;

wherein feedforward filters of a decision-feedback-equalization (DFE) with real-valued feedback filter are used for filtering of the received signals, which are optimized systematically, in particular according to the criteria zero-forcing (ZF), minimum mean-squared (MMSE), or impulse truncation.

* * * * *